US012802975B2

(12) United States Patent
Zhu et al.

(10) Patent No.: US 12,802,975 B2
(45) Date of Patent: Nov. 17, 2026

(54) LITHIUM-RICH MANGANESE-BASED POSITIVE ELECTRODE MATERIAL FOR USE IN LITHIUM-ION BATTERY, PREPARATION METHOD FOR THE MATERIAL, POSITIVE ELECTRODE TAB, LITHIUM-ION BATTERY, AND ELECTRIC VEHICLE

(71) Applicant: SVolt Energy Technology Company Limited, Changzhou (CN)

(72) Inventors: Jinxin Zhu, Changzhou (CN); Pengfei Wang, Changzhou (CN); Lei Liang, Changzhou (CN); Jing Li, Changzhou (CN)

(73) Assignee: SVolt Energy Technology Co., Ltd., Changzhou (CN)

( * ) Notice: Subject to any disclaimer, the term of this patent is extended or adjusted under 35 U.S.C. 154(b) by 912 days.

(21) Appl. No.: 17/793,259

(22) PCT Filed: Oct. 29, 2020

(86) PCT No.: PCT/CN2020/124714
§ 371 (c)(1),
(2) Date: Jul. 15, 2022

(87) PCT Pub. No.: WO2021/184764
PCT Pub. Date: Sep. 23, 2021

(65) Prior Publication Data
US 2023/0076419 A1 Mar. 9, 2023

(30) Foreign Application Priority Data
Mar. 18, 2020 (CN) ......................... 202010190732.7

(51) Int. Cl.
*H01M 4/505* (2010.01)
*C01G 53/00* (2025.01)
*C01G 53/50* (2025.01)
*C01G 53/502* (2025.01)
*H01M 4/04* (2006.01)
*H01M 4/525* (2010.01)
*H01M 4/02* (2006.01)
*H01M 10/0525* (2010.01)

(52) U.S. Cl.
CPC .......... *H01M 4/505* (2013.01); *C01G 53/502* (2025.01); *H01M 4/0471* (2013.01); *H01M 4/525* (2013.01); *C01P 2002/52* (2013.01); *C01P 2004/61* (2013.01); *C01P 2006/40* (2013.01); *H01M 2004/021* (2013.01); *H01M 2004/028* (2013.01); *H01M 10/0525* (2013.01)

(58) Field of Classification Search
CPC ...... H01M 4/04; H01M 4/0471; H01M 4/505; H01M 4/525; C01G 53/00; C01G 53/50
USPC .......................................................... 429/223
See application file for complete search history.

(56) References Cited

U.S. PATENT DOCUMENTS

2011/0052989 A1 3/2011 Venkatachalam et al.
2014/0054493 A1 2/2014 Kim et al.
2015/0010823 A1* 1/2015 Yu et al. ................ C01D 15/02 429/223
2016/0133929 A1* 5/2016 Hah et al. ........... H01M 4/5825 429/223
2017/0207444 A1* 7/2017 Yanagihara et al. ......................... H01M 50/251
2017/0207500 A1 7/2017 Amine et al.
2019/0036113 A1 1/2019 Ishikawa et al.

FOREIGN PATENT DOCUMENTS

CN 103069622 A 4/2013
CN 103500824 A 1/2014
CN 103943842 A 7/2014
CN 104282879 A 1/2015
CN 105164834 A 12/2015
CN 106910887 A 6/2017
CN 107579215 A 1/2018
CN 108023089 A 5/2018
CN 109411735 A 3/2019
CN 109565046 A 4/2019
CN 109860569 A 6/2019
CN 106532018 B 4/2020
CN 111430703 A 7/2020

OTHER PUBLICATIONS

International Search Report mailed Feb. 2, 2021, in connection with International Application No. PCT/CN2020/124714.
Chinese Office Action mailed Nov. 15, 2021, in connection with Chinese Application No. 202010190732.7.
Extended European Search Report dated Sep. 21, 2023, in connection with European Application No. 20925911.8.

* cited by examiner

*Primary Examiner* — Kevin P Kerns
(74) *Attorney, Agent, or Firm* — Wolf, Greenfield & Sacks, P.C.

(57) ABSTRACT

Provided-is a lithium-rich manganese-based positive electrode material used in a lithium-ion battery. The lithium-rich manganese-based positive electrode material includes a crystal formed by $xLi_{2+\alpha}Mn_{(1-\mu-\lambda)}Ti_{\mu}M_{\lambda}O_{3-v}M'_{v'}(1-x)Li_{1+\alpha'}Ni_{a}Co_{b}Mn_{c}M_{\lambda'}O_{2-v'}M'_{v'}$. The lithium-rich manganese-based positive electrode material provides increased structural stability in a charging-discharging cycle, is not prone to experiencing an expansion or contraction that causes grain boundary stress imbalance, is not prone to undergoing a side reaction with an electrolytic solution, and is easy to industrialize; moreover, the lithium-ion battery made with the material provides great cycle performance, great rate performance, and great commercial prospect.

5 Claims, 5 Drawing Sheets

LITHIUM-RICH MANGANESE-BASED POSITIVE ELECTRODE MATERIAL FOR USE IN LITHIUM-ION BATTERY, PREPARATION METHOD FOR THE MATERIAL, POSITIVE ELECTRODE TAB, LITHIUM-ION BATTERY, AND ELECTRIC VEHICLE

CROSS-REFERENCE TO RELATED APPLICATIONS

This Application is a national stage filing under 35 U.S.C. § 371 of International Patent Application Serial No. PCT/CN2020/124714, filed Oct. 29, 2020, which claims priority to Chinese application number 202010190732.7 filed on Mar. 18, 2020. The entire contents of these applications are incorporated herein by reference in their entirety.

TECHNICAL FIELD

The present disclosure relates to the technical field of lithium-ion batteries, for example, to a lithium-rich manganese-based positive electrode material for use in a lithium-ion battery, a preparation method therefor, a positive electrode plate, a lithium-ion battery, and an electric vehicle.

BACKGROUND

At present, due to the rapid development of battery technologies, the automobile industry is undergoing tremendous change. Battery electric vehicles and hybrid electric vehicles have gained unprecedented attention, and major automobile manufacturers have been investing a lot of money and manpower to speed up the development and accumulation of related technologies, so as to avoid losing opportunities or even being eliminated from the competition of new energy. However, although battery electric vehicles powered by electricity have the advantage of environmental friendliness, the current battery technologies still cannot fully meet market demands, such as battery cost, performance degradation, cruising range, safety issues, etc., which more or less affect the buying inclination of consumers. In order to solve the problem of range anxiety, researchers have been trying to develop positive electrode materials with high energy density for lithium-ion batteries to obtain lithium-ion batteries with high energy density. The lithium-rich manganese-based positive electrode material, $xLi_2MnO_3.(1-x)LiMO_2$ (M=Ni, Co, Mn, etc.), is a type of positive electrode material that has high specific discharge capacity and high energy density and has been widely concerned by academia and industry. In addition, such a material has good thermal stability and a differential scanning calorimetry (DSC) decomposition temperature of up to 240° C. and shows significant advantages over high nickel ternary positive electrode materials such as nickel cobalt lithium manganate and nickel cobalt lithium aluminate. However, the lithium-rich manganese-based positive electrode material also has many defects, one of which is the serious capacity degradation during a charge-discharge cycle, which directly affects the commercial application prospects of the lithium-rich manganese-based positive electrode material.

Therefore, the existing technologies related to lithium-rich manganese-based positive electrode materials still need to be improved.

SUMMARY

The present disclosure provides a lithium-rich manganese-based positive electrode material for use in a lithium-ion battery. The lithium-rich manganese-based positive electrode material provides high structural stability in the charging-discharging cycle, is not prone to experiencing expansion or contraction that causes grain boundary stress imbalance, is not prone to undergoing a side reaction with an electrolyte, and is easy to industrialize; moreover, the lithium-ion battery made with the material has great cycle performance, great rate capability, and great commercial prospects.

The present disclosure provides a lithium-rich manganese-based positive electrode material used in a lithium-ion battery in an embodiment. The lithium-rich manganese-based positive electrode material includes a crystal formed by $xLi_{2+\alpha}Mn_{(1-\mu-\lambda)}Ti_\mu M_\lambda O_{3-\nu}M'_{\nu'}(1-x)Li_{1+\alpha'}Ni_aCo_bMn_cM_{\lambda'}O_{2-\nu'}M'_{\nu'}$, wherein $0.4<x<0.6$, $0\leq\alpha<0.1$, $0<\mu\leq0.2$, $0<\lambda\leq0.05$, and $0.005\leq\nu\leq0.02$; $0\leq\alpha'\leq0.04$, $0<a<0.3$, $0<b<0.3$, $0<c<0.5$, $0<\lambda'<0.1$, $0<\nu'\leq0.01$, and $\alpha'+a+b+c+\lambda'=1$; M includes at least one of $Al^{3+}$, $Mg^{2+}$, $Ti^{4+}$, $Zr^{4+}$, $Zn^{2+}$, $Ca^{2+}$, $B^{3+}$, $Cr^{3+}$, $Cr^{6+}$ or $Ce^{3+}$, $Ce^{4+}$; M' includes at least one of $F^-$, $Cl^-$, $Br^-$, $C^{4-}$, $N^{3-}$, $S^{2-}$, $P^{3-}$ or $Se^{2-}$.

The lithium-rich manganese-based positive electrode material of the present disclosure provides high structural stability in the charging-discharging cycle, is not prone to experiencing expansion or contraction that causes grain boundary stress imbalance, is not prone to undergoing a side reaction with an electrolyte, and is easy to industrialize; moreover, the lithium-ion battery made with the material has great cycle performance, great rate capability, and great commercial prospects.

In an embodiment, the median diameter D50 of the lithium-rich manganese-based positive electrode material is 3 μm to 14 μm, for example, 3 μm, 4 μm, 5 μm, 6 μm, 7 μm, 8 μm, 9 μm, 10 μm, 11 μm, 12 μm, 13 μm or 14 μm, etc.

In an embodiment, the median diameter D50 of singly crystalline particles of the lithium-rich manganese-based positive electrode material is 1 nm to 200 nm, for example, 1 nm, 2 nm, 5 nm, 10 nm, 20 nm, 30 nm, 40 nm, 50 nm, 100 nm or 200 nm, etc.

In an embodiment, the lithium-rich manganese-based positive electrode material is at least one of $0.5Li_2Mn_{0.97}Ti_{0.01}B_{0.02}O_{2.95}F_{0.05}.0.5LiNi_{0.4}Co_{0.4}Mn_{0.22}B_{0.02}O_{1.95}F_{0.05}$ or $0.5Li_2Mn_{0.98}B_{0.02}O_{2.95}F_{0.05}\cdot0.5LiNi_{0.4}Co_{0.4}Mn_{0.22}B_{0.02}O_{1.95}F_{0.05}$.

The present disclosure provides a method for preparing the above-mentioned lithium-rich manganese-based positive electrode material in an embodiment. The method includes the following steps:

(1) performing a first calcination treatment on a precursor for preparing a lithium-rich manganese-based positive electrode material to obtain a first prefab;

(2) mixing the first prefab in step (1) with an additive including M and M' to obtain a first mixture;

(3) performing a second calcination treatment on the first mixture in step (2) to obtain a second prefab;

(4) mixing the second prefab in step (3) with a lithium source to obtain a second mixture; and (5) performing a third calcination treatment on the second mixture in step (4) to obtain the lithium-rich manganese-based positive electrode material.

In an embodiment, the precursor in step (1) includes at least one of $Ni_{0.2}Co_{0.2}Mn_{0.595}Ti_{0.005}CO_3$ or $Ni_{0.2}Co_{0.2}Mn_{0.595}Ti_{0.005}CO_{2.95}F_{0.05}$.

In an embodiment, the first calcination treatment in step (1) is performed at a temperature of 300° C. to 800° C., for example, 300° C., 400° C., 500° C., 600° C., 700° C. or 800° C., etc.

In an embodiment, the first calcination treatment in step (1) is performed for 4 hours to 12 hours, for example, 4 hours, 6 hours, 8 hours, 10 hours or 12 hours, etc.

In an embodiment, the first calcination treatment in step (1) is performed in an $O_2$ and/or $N_2$ atmosphere.

In an embodiment, the additive including M and M' in step (2) may be one additive including both M and M', or may be a mixture of an additive including M and an additive including M'. For example, in some embodiments of the present disclosure, the additive may be boride $B_2O_3$, boric acid $H_3BO_3$, lithium tetrafluoroborate $LiBF_4$, etc. The specific manner of mixing the two above-mentioned additives is not particularly limited and can be flexibly selected by those skilled in the art according to the actual needs, which will not be described in detail herein.

In an embodiment, the second calcination treatment in step (3) is performed at a temperature of 330° C. to 820° C., for example, 330° C., 400° C., 500° C., 600° C., 700° C. or 820° C., etc.

In an embodiment, the second calcination treatment in step (3) is performed for 6 hours to 12 hours, for example, 6 hours, 7 hours, 8 hours, 9 hours, 10 hours, 11 hours or 12 hours, etc.

In an embodiment, the second calcination treatment in step (3) is performed in an $O_2$ and/or $N_2$ atmosphere.

In an embodiment, the lithium source in step (4) includes at least one of $LiOH.H_2O$ or $Li_2CO_3$ and at least one of LiF or $NH_4F$ so that sufficient lithium sources are provided to effectively prepare the above-mentioned lithium-rich manganese-based positive electrode material.

In an embodiment, the third calcination treatment in step (5) is performed at a temperature of 700° C. to 950° C., for example, 700° C., 750° C., 800° C., 850° C., 900° C. or 950° C., etc.

In an embodiment, the third calcination treatment in step (5) is performed for 10 hours to 24 hours, for example, 10 hours, 12 hours, 14 hours, 16 hours, 18 hours, 20 hours, 21 hours, 22 hours, 23 hours or 24 hours, etc.

In an embodiment, the third calcination treatment in step (5) is performed in an $O_2$ and/or $N_2$ atmosphere.

The present disclosure provides a positive electrode plate in an embodiment. The positive electrode plate includes the above-mentioned lithium-rich manganese-based positive electrode material.

The present disclosure provides a lithium-ion battery in an embodiment. The ion battery includes the above-mentioned positive electrode plate.

The present disclosure provides an electric vehicle in an embodiment. The electric vehicle includes the above-mentioned ion battery.

BRIEF DESCRIPTION OF DRAWINGS

The drawings are used to provide a further understanding of the technical solutions of the present disclosure, and constitute a part of the specification, explain the technical solutions of the present application in conjunction with the embodiments of the present disclosure, and do not limit the technical solutions of the present disclosure.

DETAILED DESCRIPTION

Figure 1:
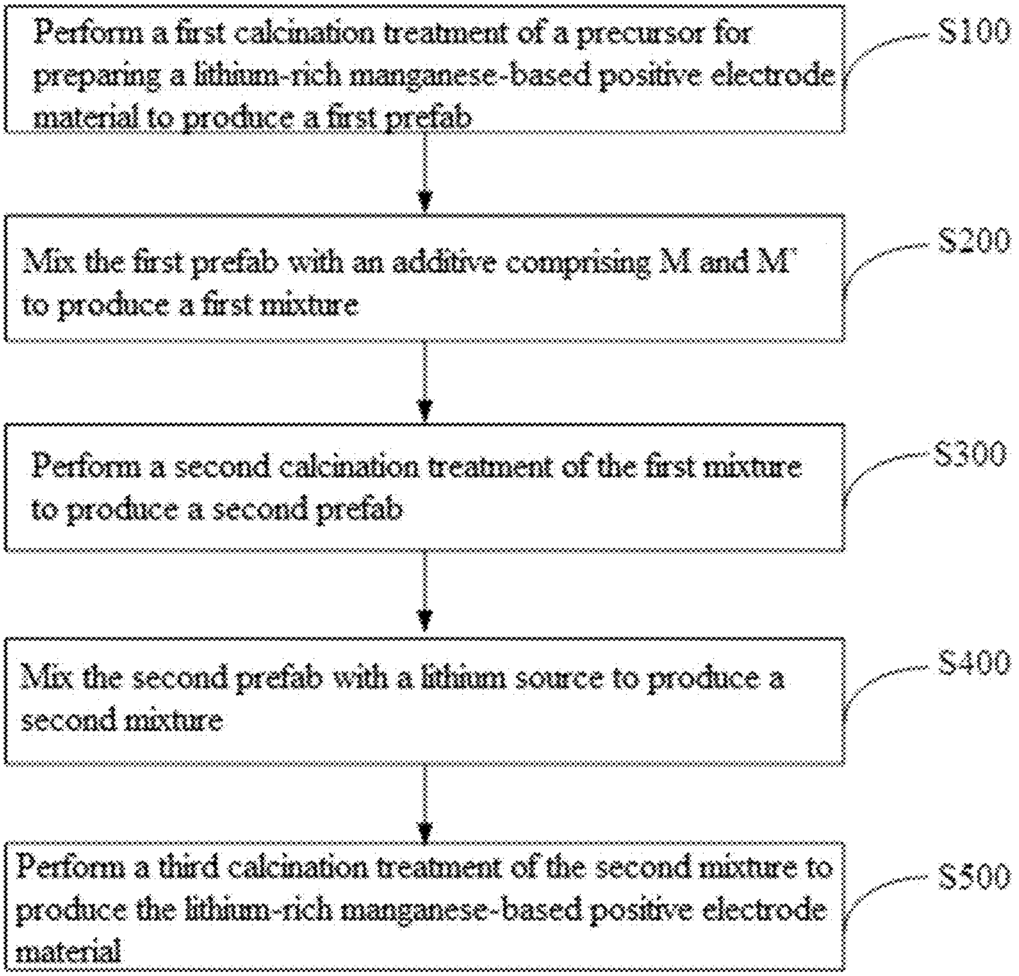
FIG. 1 is a flowchart of a method for preparing a lithium-rich manganese-based positive electrode material according to an embodiment of the present disclosure.

The lithium-rich manganese-based positive electrode material in the related art exhibits high specific capacity only under the condition of high cut-off voltage (discharge specific capacity is greater than or equal to 250 mAh/g within a voltage window of 2 V to 4.8 V). Therefore, the requirement for the electrochemical stability of the electrolyte is demanding, so as to avoid adverse side reactions between the electrolyte and the lithium-rich manganese-based positive electrode material. Secondly, the content of manganese in the lithium-rich manganese-based positive electrode material usually exceeds 40%, which is much higher than the content of nickel and cobalt, while the metallic conductivity of manganese is only $0.2\times10^7$ S/m, which is about ⅛ of the metallic conductivity of cobalt, which results in that the lithium ion intercalation/deintercalation behaviors are greatly resisted when the lithium-rich manganese-based positive electrode material undergoes charging and discharging at a large current, affecting the rate capability. Then, the lithium-rich manganese-based positive electrode material consists of $Li_2MnO_3$ (space group C2/m) and $LiMO_2$ (space group R3-m), $Li_2MnO_3$ tends to undergo phase inversion to $Li_2MnO_3$ in thermodynamics, and multiple charge-discharge cycles can promote the phase inversion. Therefore, when $LiMn_2O_4$ accumulates to certain content, the number of intercalation sites of lithium ions in the lithium-rich manganese-based positive electrode material is greatly reduced. More importantly, for the lithium-rich manganese-based positive electrode material, the crystals in the structure show complex existing forms due to the preferred orientation, leading to the presence of anisotropic stress at the grain boundaries between crystalline grains. During the charge-discharge cycle, these crystalline grains contract and expand with the intercalation and deintercalation of lithium ions, which results in the stress intensification at the grain boundaries and finally causes micro-cracks within the crystalline grains, leading to the poor cycle performance of lithium-ion batteries prepared by the lithium-rich manganese-based positive electrode material.

The present disclosure provides a lithium-rich manganese-based positive electrode material used in a lithium-ion battery in an embodiment. The lithium-rich manganese-based positive electrode material includes a crystal formed by $xLi_{2+\alpha}Mn_{(1-\mu-\lambda)}Ti_{\mu}M_{\lambda}O_{3-\nu}M'_{\nu}.(1-x)Li_{1+\alpha'}Ni_{a}Co_{b}Mn_{c}M_{\lambda'}O_{2-\nu'}M'_{\nu'}$, wherein $0.4<x<0.6$, $0\leq\alpha<0.1$, $0<\mu\leq0.2$, $0<\lambda\leq0.05$, and $0.005\leq\nu\leq0.02$; $0\leq\alpha'\leq0.04$, $0<a<0.3$, $0<b<0.3$, $0<c<0.5$, $0<\lambda'<0.1$, $0<\nu'\leq0.01$, and $\alpha'+a+b+c+\lambda'=1$; M includes at least one of $Al^{3+}$, $Mg^{2+}$, $Ti^{4+}$, $Zr^{4+}$, $Zn^{2+}$, $Ca^{2+}$, $B^{3+}$, $Cr^{3+}$, $Cr^{6+}$ or $Ce^{3+}$, $Ce^{4+}$; M' includes at least one of $F^-$, $Cl^-$, $Br^-$, $C^{4-}$, $N^{3-}$, $S^{2-}$, $P^{3-}$ or $Se^{2-}$.

In the present disclosure, chemical bonds with high strength are introduced in the lithium-rich manganese-based positive electrode material through M and M' to anchor the boundary regions of the crystalline grains so that the impact of grain boundary stress on the lithium-rich manganese-based positive electrode material can be relieved to a certain extent, thereby improving the structural stability of the lithium-rich manganese-based positive electrode material. Therefore, the lithium-rich manganese-based positive electrode material of the present disclosure provides high structural stability in the charging-discharging cycle, is not prone to experiencing expansion or contraction that causes grain boundary stress imbalance, is not prone to undergoing a side reaction with the electrolyte, and is easy to industrialize; moreover, the lithium-ion battery made with the material has great cycle performance, great rate capability, and great commercial prospects. The lithium-rich manganese-based positive electrode material of the present disclosure provides high structural stability in the charging-discharging cycle, is not prone to experiencing expansion or contraction that causes grain boundary stress imbalance, is not prone to undergoing a side reaction with the electrolyte, and is easy to industrialize; moreover, the lithium-ion battery made with the material has great cycle performance, great rate capability, and great commercial prospects.

In an embodiment, the median diameter D50 of the lithium-rich manganese-based positive electrode material is 3 μm to 14 μm, for example, 3 μm, 4 μm, 5 μm, 6 μm, 7 μm, 8 μm, 9 μm, 10 μm, 11 μm, 12 μm, 13 μm or 14 μm, etc.

In the related art, the median diameter D50 of the lithium-rich manganese-based positive electrode material is 3 μm to 14 μm so that the lithium-rich manganese-based positive electrode material provides high structural stability in the charging-discharging cycle, is not prone to experiencing expansion or contraction that causes grain boundary stress imbalance, and is not prone to undergoing a side reaction with the electrolyte, and the lithium-ion battery made with the material has great cycle performance and great rate capability.

In an embodiment, the median diameter D50 of singly crystalline particles of the lithium-rich manganese-based positive electrode material is 1 nm to 200 nm, for example, 1 nm, 2 nm, 5 nm, 10 nm, 20 nm, 30 nm, 40 nm, 50 nm, 100 nm or 200 nm, etc.

The median diameter D50 of singly crystalline particles of the lithium-rich manganese-based positive electrode material of the present disclosure is 1 nm to 200 nm so that the lithium-rich manganese-based positive electrode material provides high structural stability in the charging-discharging cycle, is not prone to experiencing expansion or contraction that causes grain boundary stress imbalance, and is not prone to undergoing a side reaction with the electrolyte, and the lithium-ion battery made with the material has great cycle performance and great rate capability.

In an embodiment, the lithium-rich manganese-based positive electrode material is at least one of $0.5Li_2Mn_{0.97}Ti_{0.01}B_{0.02}O_{2.95}F_{0.05}\cdot 0.5LiNi_{0.4}Co_{0.4}Mn_{0.22}B_{0.02}O_{1.95}F_{0.05}$ or $0.5Li_2Mn_{0.98}B_{0.02}O_{2.95}F_{0.05}\cdot 0.5LiNi_{0.4}Co_{0.4}Mn_{0.22}B_{0.02}O_{1.95}F_{0.05}$.

Compared with other specific types of lithium-rich manganese-based positive electrode materials, the lithium-rich manganese-based positive electrode material of the present disclosure provides higher structural stability in the charging-discharging cycle, is less prone to experiencing expansion or contraction that causes grain boundary stress imbalance, and is less prone to undergoing a side reaction with the electrolyte, and the lithium-ion battery made with the material has better cycle performance and better rate capability.

The present disclosure provides a method for preparing the above-mentioned lithium-rich manganese-based positive electrode material in an embodiment. With reference to FIG. 1, the method includes steps S100, S200, S300, S400, and S500.

In S100, a first calcination treatment is performed on a precursor for preparing a lithium-rich manganese-based positive electrode material to obtain a first prefab.

In an embodiment, the precursor includes at least one of $Ni_{0.2}Co_{0.2}Mn_{0.595}Ti_{0.005}CO_3$ or $Ni_{0.2}Co_{0.2}Mn_{0.595}Ti_{0.005}CO_{2.95}F_{0.05}$.

In an embodiment, the first calcination treatment is performed at a temperature of 300° C. to 800° C., for example, 300° C., 400° C., 500° C., 600° C., 700° C. or 800° C., etc.

In an embodiment, the first calcination treatment is performed for 4 hours to 12 hours, for example, 4 hours, 6 hours, 8 hours, 10 hours or 12 hours, etc.

In an embodiment, the first calcination treatment is performed in an $O_2$ and/or $N_2$ atmosphere.

In the present disclosure, with the first calcination treatment performed in an $O_2$ and/or $N_2$ atmosphere, other impurities are not prone to being introduced, and other side reactions are not prone to happening, thereby effectively preparing the above-mentioned lithium-rich manganese-based positive electrode material.

In S200, the first prefab is mixed with an additive including M and M' to obtain a first mixture.

In an embodiment, the additive including M and M' may be one additive including both M and M' or may be a mixture of an additive including M and an additive including M'. For example, in some embodiments of the present disclosure, the additive may be boride $B_2O_3$, boric acid $H_3BO_3$, lithium tetrafluoroborate $LiBF_4$, etc. The specific manner of mixing the two above-mentioned additives is not particularly limited and can be flexibly selected by those skilled in the art according to the actual needs, which will not be described in detail herein.

In S300, a second calcination treatment is performed on the first mixture to obtain a second prefab.

In an embodiment, the second calcination treatment is performed at a temperature of 330° C. to 820° C., for example, 330° C., 400° C., 500° C., 600° C., 700° C. or 820° C., etc.

In an embodiment, the second calcination treatment is performed for 6 hours to 12 hours, for example, 6 hours, 7 hours, 8 hours, 9 hours, 10 hours, 11 hours or 12 hours, etc.

In an embodiment, the second calcination treatment is performed in an $O_2$ and/or $N_2$ atmosphere.

In the present disclosure, with the second calcination treatment performed in an $O_2$ and/or $N_2$ atmosphere, other impurities are not prone to being introduced, and other side reactions are not prone to happening, thereby effectively preparing the above-mentioned lithium-rich manganese-based positive electrode material.

In S400, the second prefab is mixed with a lithium source to obtain a second mixture.

In an embodiment, the lithium source in step (4) includes at least one of $LiOH.H_2O$ or $Li_2CO_3$ and at least one of LiF or $NH_4F$ so that sufficient lithium sources are provided to effectively prepare the above-mentioned lithium-rich manganese-based positive electrode material.

In S500, a third calcination treatment is performed on the second mixture to obtain the lithium-rich manganese-based positive electrode material.

In an embodiment, the third calcination treatment is performed at a temperature of 700° C. to 950° C., for example, 700° C., 750° C., 800° C., 850° C., 900° C. or 950° C., etc.

In an embodiment, the third calcination treatment is performed for 10 hours to 24 hours, for example, 10 hours, 12 hours, 14 hours, 16 hours, 18 hours, 20 hours, 21 hours, 22 hours, 23 hours or 24 hours, etc.

In an embodiment, the third calcination treatment is performed in an $O_2$ and/or $N_2$ atmosphere.

In the present disclosure, with the third calcination treatment performed in an $O_2$ and/or $N_2$ atmosphere, other impurities are not prone to being introduced, and other side reactions are not prone to happening, thereby effectively preparing the above-mentioned lithium-rich manganese-based positive electrode material.

The present disclosure provides a positive electrode plate in an embodiment. The positive electrode plate includes the above-mentioned lithium-rich manganese-based positive electrode material.

The positive electrode plate of the present disclosure also includes other components of a conventional positive electrode plate, such as a substrate, a conductive agent, a binder, a thickener, etc., which will not be described in detail herein.

The positive electrode plate of the present disclosure provides high stability, is not prone to undergoing a side reaction with the electrolyte, and is easy to industrialize; moreover, the lithium-ion battery made with the positive electrode plate has great cycle performance, great rate capability, and great commercial prospects.

The present disclosure provides a lithium-ion battery in an embodiment. The ion battery includes the above-mentioned positive electrode plate.

The lithium-ion battery of the present disclosure has great cycle performance, great rate capability, and great commercial prospects.

The present disclosure provides an electric vehicle in an embodiment. The electric vehicle includes the above-mentioned ion battery.

The shape, structure, and manufacturing process of the electric vehicle of the present disclosure are the shapes, structures, and manufacturing processes of conventional electric vehicles.

Example 1

1 mol of $Ni_{0.2}Co_{0.2}Mn_{0.595}Ti_{0.005}CO_3$ was subjected to the first calcination treatment in a calciner at 600° C. for 4 hours in the mixed gas of $O_2$ and $N_2$ with a volume fraction of oxygen of 2%. Then the calcined product and 0.01 mol of $B_2O_3$ were thoroughly ground and mixed in a grinder and then subjected to the second calcination treatment in a calciner at 630° C. for 6 hours in the mixed gas of $O_2$ and $N_2$ with a volume fraction of oxygen of 2%. Then the powder sample obtained after the second calcination treatment, 1.45 mol of $LiOH.H_2O$, and 0.05 mol of LiF were thoroughly ground and mixed in a mortar and then subjected to the third calcination treatment in a calciner at 820° C. for 12 hours in the mixed gas of $O_2$ and $N_2$ with a volume fraction of oxygen of 2% to obtain the lithium-rich manganese-based positive electrode material. The chemical formula of the lithium-rich manganese-based positive electrode material was $0.5Li_2Mn_{0.97}Ti_{0.01}B_{0.02}O_{2.95}F_{0.05}.0.5LiNi_{0.4}Co_{0.4}Mn_{0.22}B_{0.02}O_{1.95}F_{0.05}$, the median diameter D50 was 11 μm, and the median diameter D50 of singly crystalline particles was 120 nm.

Example 2

1 mol of $Ni_{0.2}Co_{0.2}Mn_{0.595}Ti_{0.005}CO_3$ was subjected to the first calcination treatment in a calciner at 600° C. for 4 hours in the mixed gas of $O_2$ and $N_2$ with a volume fraction of oxygen of 2%. Then the calcined product and 0.02 mol of $H_3BO_3$ were thoroughly ground and mixed in a grinder and then subjected to the second calcination treatment in a calciner at 650° C. for 5 hours in the mixed gas of $O_2$ and $N_2$ with a volume fraction of oxygen of 2%. Then the powder sample obtained after the second calcination treatment, 1.45 mol of $LiOH.H_2O$, and 0.05 mol of LiF were thoroughly ground and mixed in a mortar and then subjected to the third calcination treatment in a calciner at 820° C. for 12 hours in the mixed gas of $O_2$ and $N_2$ with a volume fraction of oxygen of 2% to obtain the lithium-rich manganese-based positive electrode material. The chemical formula of the lithium-rich manganese-based positive electrode material was $0.5Li_2Mn_{0.97}Ti_{0.01}B_{0.02}O_{2.95}F_{0.05}.0.5LiNi_{0.4}Co_{0.4}Mn_{0.22}B_{0.02}O_{1.95}F_{0.05}$, the median diameter D50 was 11 μm, and the median diameter D50 of singly crystalline particles was 120 nm.

Example 3

1 mol of $Ni_{0.2}Co_{0.2}Mn_{0.595}Ti_{0.003}Ce_{0.002}CO_3$ was subjected to the first calcination treatment in a calciner at 600° C. for 4 hours in the mixed gas of $O_2$ and $N_2$ with a volume fraction of oxygen of 2%. Then the calcined product and 0.02 mol of $H_3BO_3$ were thoroughly ground and mixed in a grinder and then subjected to the second calcination treatment in a calciner at 650° C. for 5 hours in the mixed gas of $O_2$ and $N_2$ with a volume fraction of oxygen of 2%. Then the powder sample obtained after the second calcination treatment, 1.45 mol of $LiOH.H_2O$, and 0.05 mol of LiF were thoroughly ground and mixed in a mortar and then subjected to the third calcination treatment in a calciner at 820° C. for 12 hours in the mixed gas of $O_2$ and $N_2$ with a volume fraction of oxygen of 2% to obtain the lithium-rich manganese-based positive electrode material. The chemical formula of the lithium-rich manganese-based positive electrode material was $0.5Li_2Mn_{0.97}Ti_{0.006}Ce_{0.004}B_{0.02}O_{2.95}F_{0.05}.0.5LiNi_{0.4}Co_{0.4}Mn_{0.22}B_{0.02}O_{1.95}F_{0.05}$, the median diameter D50 was 11 μm, and the median diameter D50 of singly crystalline particles was 120 nm.

Example 4

1 mol of $Ni_{0.2}Co_{0.2}Mn_{0.595}Ti_{0.003}Al_{0.002}CO_3$ was subjected to the first calcination treatment in a calciner at 600° C. for 4 hours in the mixed gas of $O_2$ and $N_2$ with a volume fraction of oxygen of 2%. Then the calcined product and 0.02 mol of $H_3BO_3$ were thoroughly ground and mixed in a grinder and then subjected to the second calcination treatment in a calciner at 650° C. for 5 hours in the mixed gas of $O_2$ and $N_2$ with a volume fraction of oxygen of 2%. Then the powder sample obtained after the second calcination treatment, 1.45 mol of $LiOH.H_2O$, and 0.05 mol of LiF were thoroughly ground and mixed in a mortar and then subjected to the third calcination treatment in a calciner at 820° C. for 12 hours in the mixed gas of $O_2$ and $N_2$ with a volume fraction of oxygen of 2% to obtain the lithium-rich manganese-based positive electrode material. The chemical formula of the lithium-rich manganese-based positive electrode material was $0.5Li_2Mn_{0.97}Ti_{0.006}Al_{0.004}B_{0.02}O_{2.95}F_{0.05}$ $0.5LiNi_{0.4}Co_{0.4}Mn_{0.22}B_{0.02}O_{1.95}F_{0.05}$, the median diameter D50 was 11 μm, and the median diameter D50 of singly crystalline particles was 120 nm.

Example 5

1 mol of $Ni_{0.2}Co_{0.2}Mn_{0.595}Ti_{0.003}Zr_{0.002}CO_3$ was subjected to the first calcination treatment in a calciner at 600° C. for 4 hours in the mixed gas of $O_2$ and $N_2$ with a volume fraction of oxygen of 2%. Then the calcined product and 0.02 mol of $H_3BO_3$ were thoroughly ground and mixed in a grinder and then subjected to the second calcination treatment in a calciner at 650° C. for 5 hours in the mixed gas of $O_2$ and $N_2$ with a volume fraction of oxygen of 2%. Then the powder sample obtained after the second calcination treatment, 1.45 mol of $LiOH.H_2O$, and 0.05 mol of LiF were thoroughly ground and mixed in a mortar and then subjected to the third calcination treatment in a calciner at 820° C. for 12 hours in the mixed gas of $O_2$ and $N_2$ with a volume fraction of oxygen of 2% to obtain the lithium-rich manganese-based positive electrode material. The chemical formula of the lithium-rich manganese-based positive electrode material was $0.5Li_2Mn_{0.97}Ti_{0.006}Zr_{0.004}B_{0.02}O_{2.95}F_{0.05}.0.5LiNi_{0.4}Co_{0.4}Mn_{0.22}B_{0.02}O_{1.95}F_{0.05}$, the median diameter D50 was 11 μm, and the median diameter D50 of singly crystalline particles was 120 nm.

Example 6

1 mol of $Ni_{0.2}Co_{0.2}Mn_{0.595}Ti_{0.003}Cr_{0.002}CO_3$ was subjected to the first calcination treatment in a calciner at 600° C. for 4 hours in the mixed gas of $O_2$ and $N_2$ with a volume fraction of oxygen of 2%. Then the calcined product and 0.02 mol of $H_3BO_3$ were thoroughly ground and mixed in a grinder and then subjected to the second calcination treatment in a calciner at 650° C. for 5 hours in the mixed gas of $O_2$ and $N_2$ with a volume fraction of oxygen of 2%. Then the powder sample obtained after the second calcination treatment, 1.45 mol of $LiOH.H_2O$, and 0.05 mol of LiF were thoroughly ground and mixed in a mortar and then subjected to the third calcination treatment in a calciner at 820° C. for 12 hours in the mixed gas of $O_2$ and $N_2$ with a volume fraction of oxygen of 2% to obtain the lithium-rich manganese-based positive electrode material. The chemical formula of the lithium-rich manganese-based positive electrode material was $0.5Li_2Mn_{0.97}Ti_{0.006}Cr_{0.004}B_{0.02}O_{2.95}F_{0.05}.0.5LiNi_{0.4}Co_{0.4}Mn_{0.22}B_{0.02}O_{1.95}F_{0.05}$, the median diameter D50 was 11 μm, and the median diameter D50 of singly crystalline particles was 120 nm.

Comparative Example 1

1 mol of $Ni_{0.2}Co_{0.2}Mn_{0.595}Ti_{0.005}CO_3$ was subjected to the first calcination treatment in a calciner at 600° C. for 4 hours in the mixed gas of $O_2$ and $N_2$ with a volume fraction of oxygen of 2%. Then the calcined product and 1.5 mol of $LiOH.H_2O$ were thoroughly ground and mixed in a mortar and then subjected to the third calcination treatment in a calciner at 820° C. for 12 hours in the mixed gas of $O_2$ and $N_2$ with a volume fraction of oxygen of 2% to obtain the lithium-rich manganese-based positive electrode material. The chemical formula of the lithium-rich manganese-based positive electrode material was $0.5Li_2Mn_{0.99}Ti_{0.01}O_3.0.5LiNi_{0.4}Co_{0.4}Mn_{0.2}O_2$, the median diameter D50 was 11 μm, and the median diameter D50 of singly crystalline particles was 120 nm.

Figure 2:
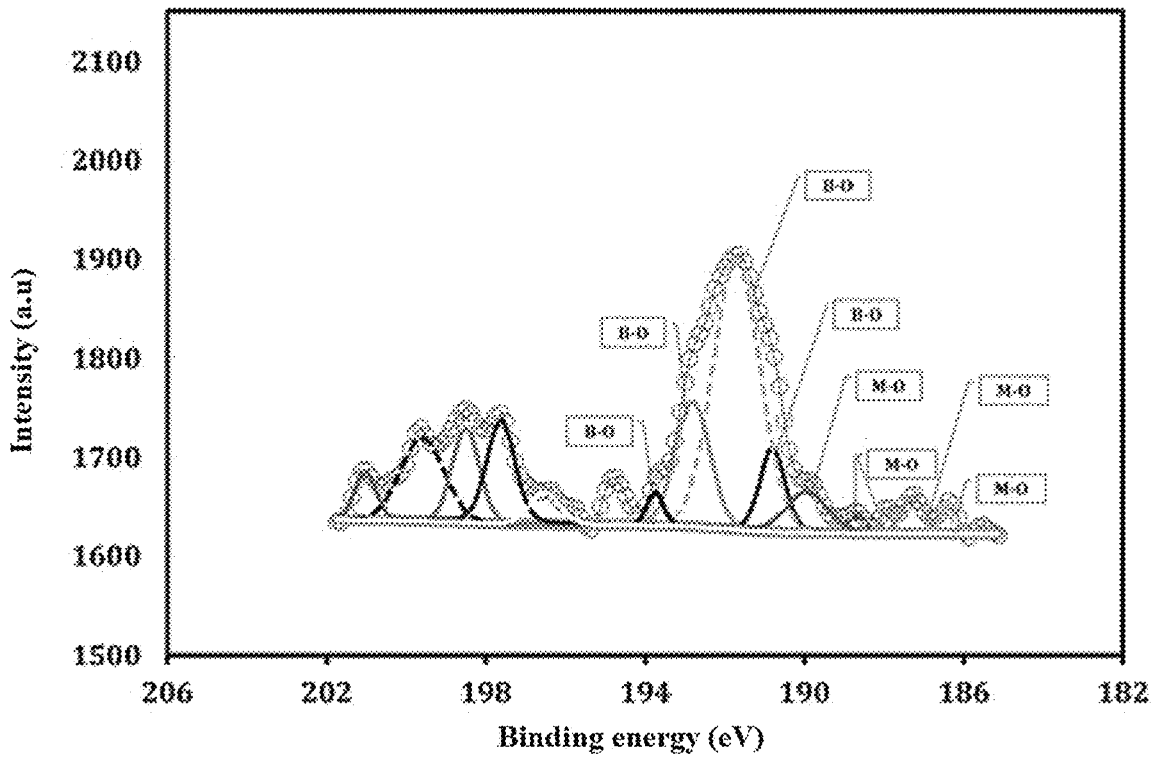
FIG. 2 is a graph of X-ray photoelectron spectroscopy (XPS) analysis test results of a lithium-rich manganese-based positive electrode material according to an embodiment of the present disclosure.
Figure 3:
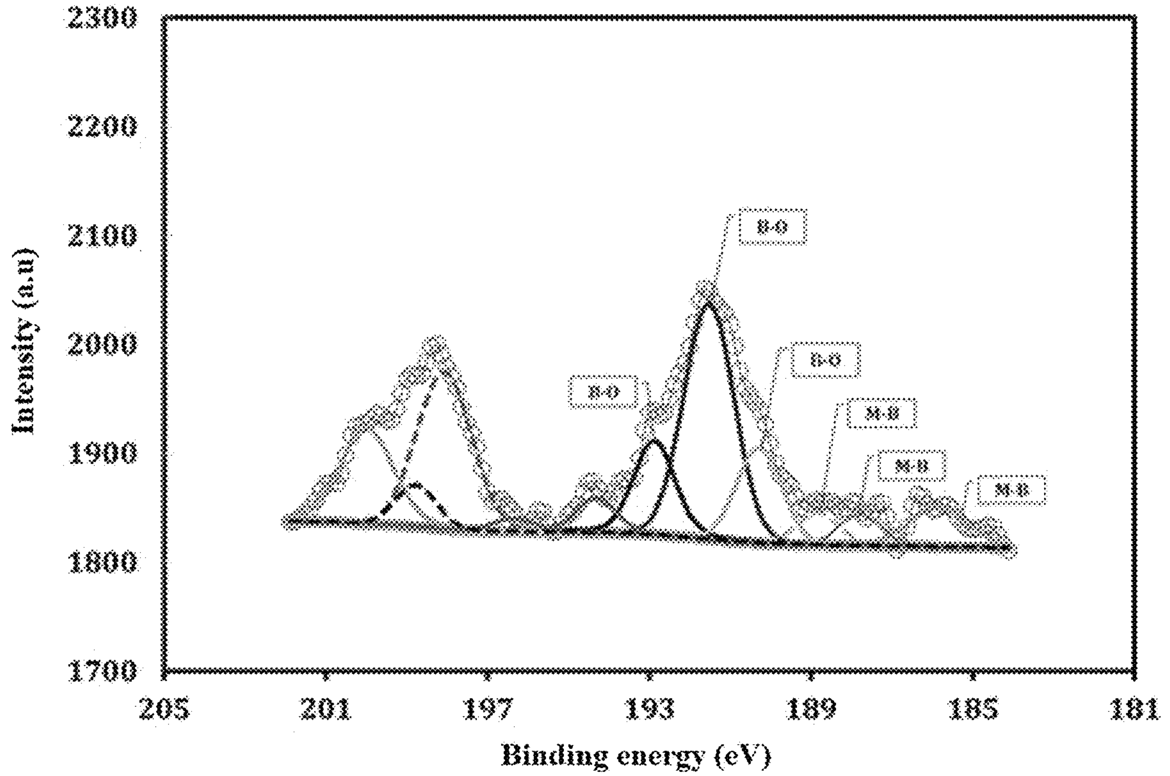
FIG. 3 is a graph of XPS analysis test results of a lithium-rich manganese-based positive electrode material according to an embodiment of the present disclosure.

Material Test:

(1) The lithium-rich manganese-based positive electrode materials obtained in Examples 1 and 2 were tested by X-ray photoelectron spectroscopy (XPS). The test process is as follows: Firstly, the lithium-rich manganese-based positive electrode material was dried in a vacuum oven at 100° C. for 4 hours, then a certain amount of lithium-rich manganese-based positive electrode material was weighed, pasted on the sample stage, and put into the sample chamber of the XPS device. The sample surface was cleaned with $C_{60}$ GCIB clusters for 30 minutes under a certain vacuum, and then X-ray scanning was performed to collect spectra. The test results are shown in FIG. 2 and FIG. 3.

(2) The button half-cell batteries prepared in Examples 1 to 6 and Comparative Example 1 were evaluated for electrical properties.

In a glove box filled with argon, lithium metal sheets were assembled into the button cell: the positive electrode plate was composed of 92 wt % of active material, 4 wt % of Super-P conductive agent, and 4 wt % of PVDF binder; the electrolyte was prepared by 1 M of $LiPF_6$, the same volume of ethylene carbonate and dimethyl carbonate, and additives.

The rate capability was tested at discharge rates of 0.1 C, 0.2 C, 0.5 C, 1 C and 2 C, respectively, and the potential window was 2 V to 4.6 V. The cycle performance test was performed after 50 cycles at charge and discharge rates of 0.5 C and 1 C, respectively. The test results are shown in Table 1 and FIGS. 4 to 7.

TABLE 1

| | Discharge rate of 0.1 C | Discharge rate of 0.5 C | Discharge rate of 1 C | Discharge rate of 2 C |
|---|---|---|---|---|
| Example 1 | 287 mAh/g | 226.4 mAh/g | 204.4 mAh/g | 180.2 mAh/g |
| Example 2 | 284.9 mAh/g | 226.3 mAh/g | 205.9 mAh/g | 187.9 mAh/g |
| Example 3 | 285.6 mAh/g | 228.5 mAh/g | 209.6 mAh/g | 190.5 mAh/g |
| Example 4 | 284.7 mAh/g | 225.1 mAh/g | 203.4 mAh/g | 184.3 mAh/g |
| Example 5 | 289.6 mAh/g | 229.6 mAh/g | 208.1 mAh/g | 188.9 mAh/g |
| Example 6 | 284.5 mAh/g | 223.3 mAh/g | 203.2 mAh/g | 182.3 mAh/g |
| Comparative Example 1 | 282.8 mAh/g | 221.4 mAh/g | 199.6 mAh/g | 178.3 mAh/g |

From the XPS spectra analysis of Examples 1 and 2 (with reference to FIG. 2 and FIG. 3), boron elements had entered the crystal lattice of the lithium-rich manganese-based positive electrode material and formed chemical bonds with oxygen elements or transition metal elements, which shows that the scheme in which grain boundaries are modified by using boron elements in Examples 1 and 2 is feasible.

Figure 4:
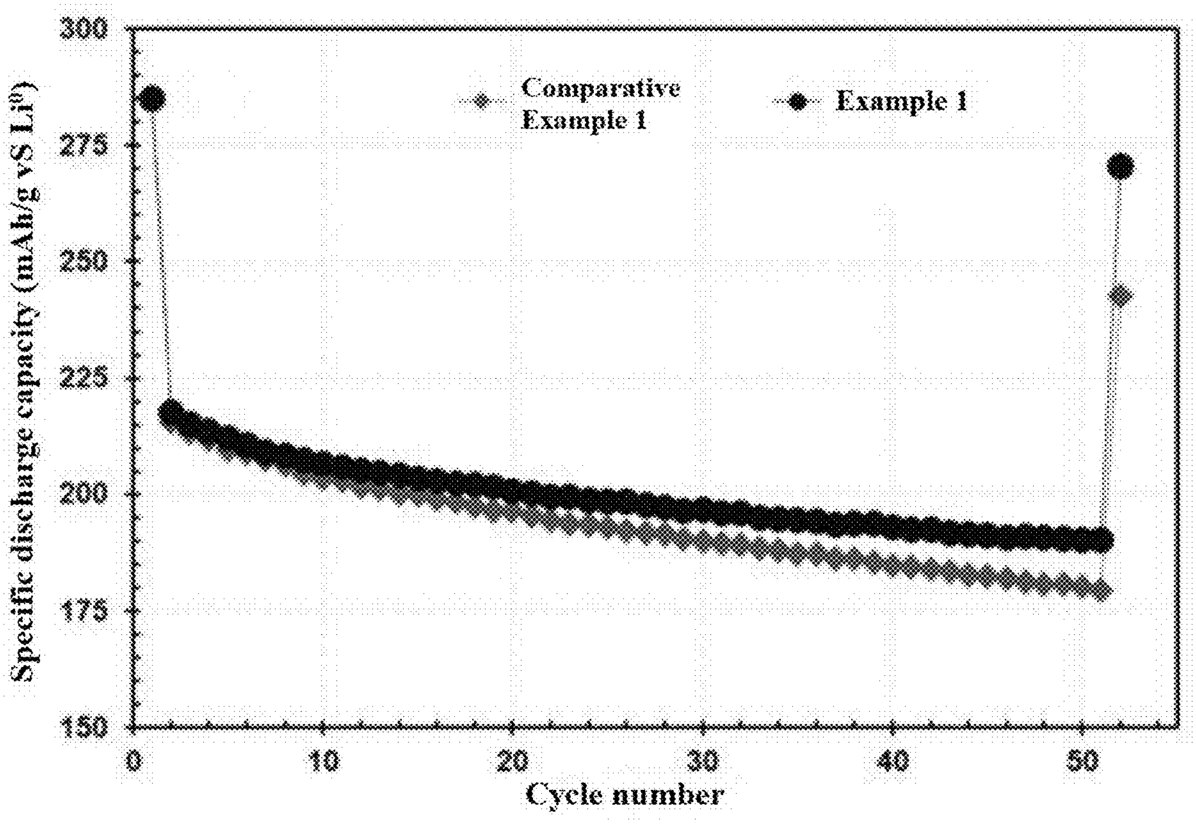
FIG. 4 is a graph of cycle performance test results of lithium-ion batteries in Example 1 and Comparative Example 1 of the present disclosure.
Figure 5:
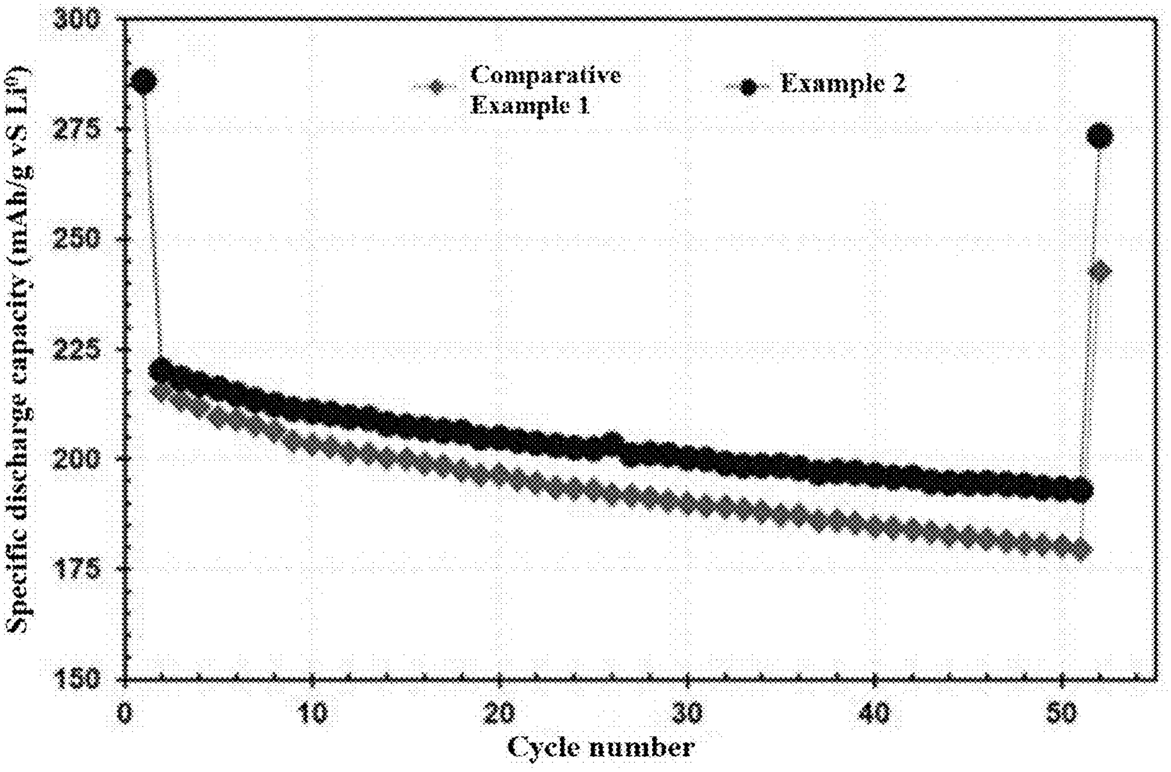
FIG. 5 is a graph of cycle performance test results of lithium-ion batteries in Example 2 and Comparative Example 1 of the present disclosure.

As can be seen from FIGS. 4 and 5, under the condition that the charging rate was 0.5 C and the discharging rate was 1 C, after 50 charge-discharge cycles, the cycle capacity retention rate of the battery prepared by the positive electrode material of Example 1 was 87.4%; the cycle capacity retention rate of the battery prepared by the positive electrode material of Example 2 reached 87.7%; the cycle capacity retention rate of the battery prepared by the positive electrode material of Comparative Example 1 was 83.2%. It can be concluded that the cycle performance of the lithium-rich manganese-based positive electrode material was improved (the capacity retention rate was increased by at least 4%) by modifying the grain boundaries of the crystalline grains of the lithium-rich manganese-based positive electrode material in the present disclosure.

Figure 6:
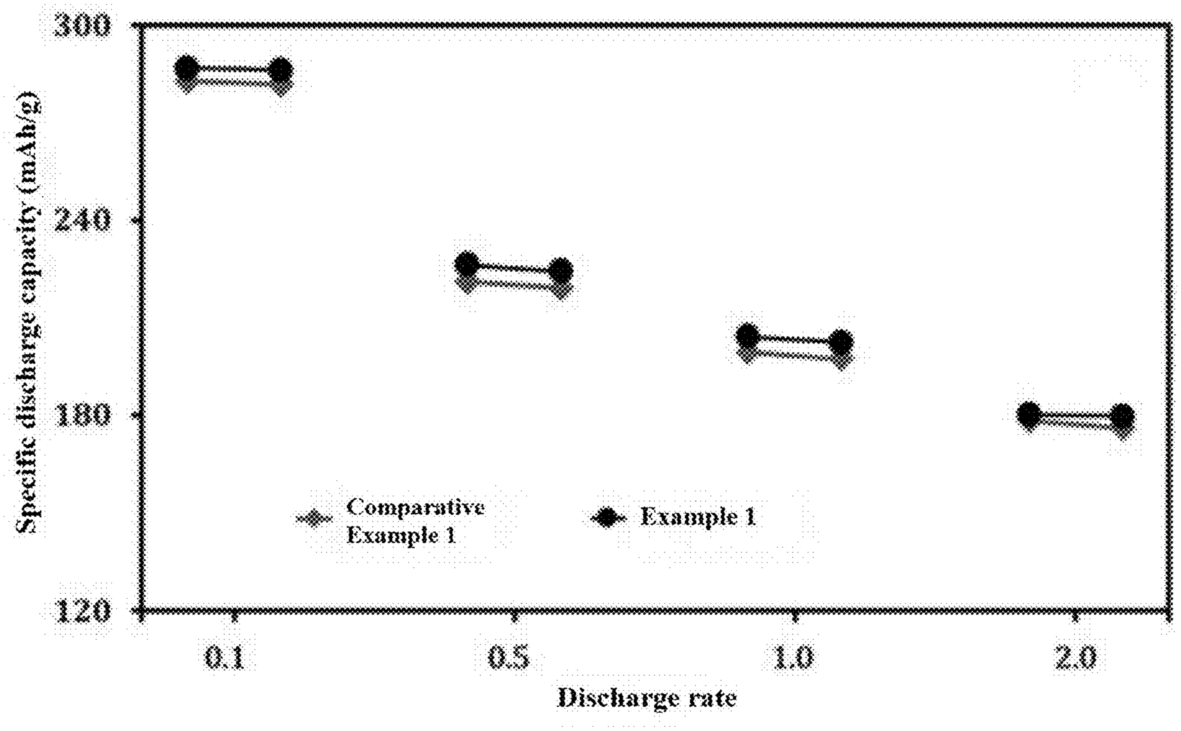
FIG. 6 is a graph of rate capability test results of lithium-ion batteries in Example 1 and Comparative Example 1 of the present disclosure.
Figure 7:
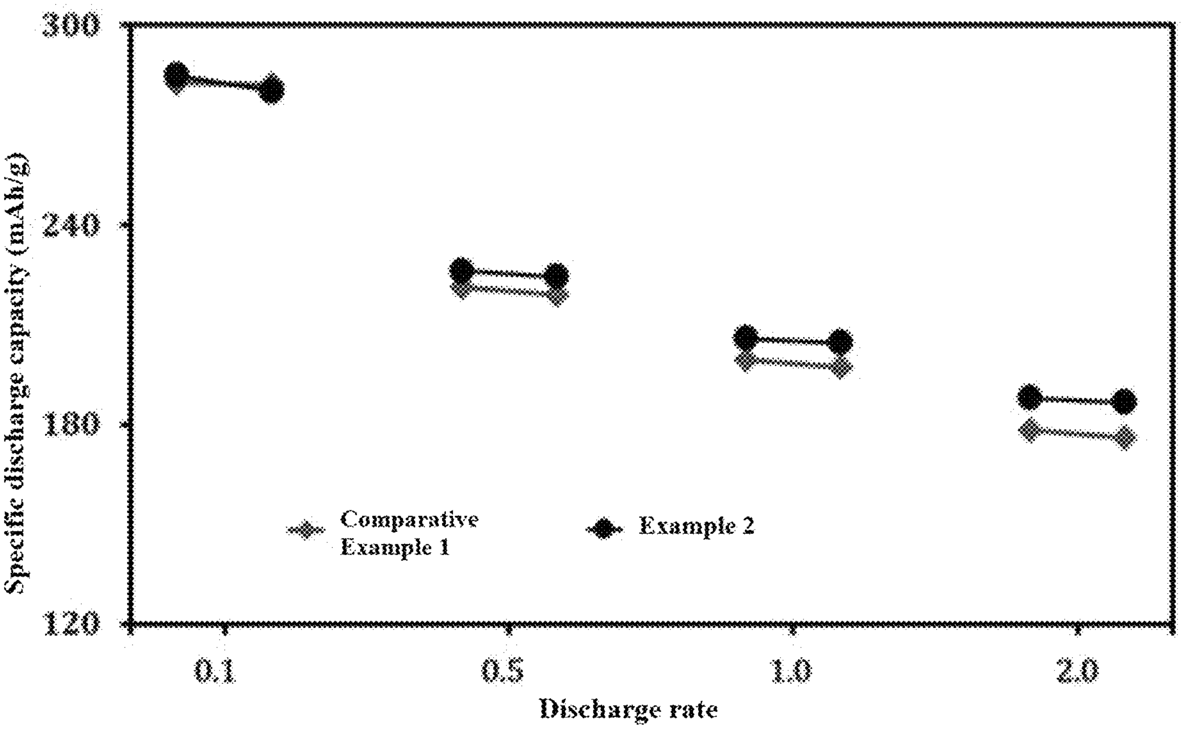
FIG. 7 is a graph of rate capability test results of lithium-ion batteries in Example 2 and Comparative Example 1 of the present disclosure.

As can be seen from FIGS. 6 and 7, the lithium-rich manganese-based positive electrode material of the present disclosure exhibited high specific discharge capacity at high discharge rates. For example, when the charge rate was 0.5 C and the discharge rate was 1 C, the specific discharge capacity of the material of Comparative Example 1 was 197.4 mAh/g while the specific discharge capacity of the materials of Example 1 and Example 2 was increased to 202.6 mAh/g and 204.6 mAh/g, respectively (the specific discharge capacity was increased by at least 3% at the rate of 1 C).

As can be seen from Table 1, with the comparison among Examples 1 to 6, the cycle performance and rate capability of the lithium-rich manganese-based positive electrode material provided in the present disclosure are significantly improved compared with the material of Comparative Example 1.

What is claimed is:

1. A lithium-rich manganese-based positive electrode material used in a lithium-ion battery, wherein the lithium-rich manganese-based positive electrode material is at least one of $0.5Li_2Mn_{0.97}Ti_{0.01}B_{0.02}O_{2.95}F_{0.05}\cdot0.5LiNi_{0.4}Co_{0.4}Mn_{0.22}B_{0.02}O_{1.95}F_{0.05}$ or $0.5Li_2Mn_{0.98}B_{0.02}O_{2.95}F_{0.05}\cdot0.5LiNi_{0.4}Co_{0.4}Mn_{0.22}B_{0.02}O_{1.95}F_{0.05}$.

2. The lithium-rich manganese-based positive electrode material according to claim 1, wherein a median diameter D50 of the lithium-rich manganese-based positive electrode material is 3 μm to 14 μm.

3. A positive electrode plate, comprising the lithium-rich manganese-based positive electrode material according to claim 1.

4. A lithium-ion battery, comprising the positive electrode plate according to claim 3.

5. An electric vehicle, comprising the lithium-ion battery according to claim 4.

* * * * *